(12) United States Patent
Buchler et al.

(10) Patent No.: US 8,170,844 B2
(45) Date of Patent: May 1, 2012

(54) ESTIMATION OF PROBABILITY OF LAMBDA FAILURE THROUGH EMPLOYMENT OF LOOKUP TABLE

(75) Inventors: Robert J. Buchler, Calabasas, CA (US); Gang Kevin Liu, Simi Valley, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 1034 days.

(21) Appl. No.: 12/151,119

(22) Filed: May 2, 2008

(65) Prior Publication Data

US 2009/0276196 A1 Nov. 5, 2009

(51) Int. Cl.
*G06F 7/60* (2006.01)
*G01C 21/00* (2006.01)
(52) U.S. Cl. .......................... 703/2; 701/213
(58) Field of Classification Search ....... 703/2; 701/213
See application file for complete search history.

(56) References Cited

U.S. PATENT DOCUMENTS 7,961,143 B2 * 6/2011 Dai et al. ................. 342/357.27

OTHER PUBLICATIONS

Khanafseh, Kempny, and Pervan, (Khanafseh hereinafter), "New Applications of Measurement Redundancy in High Performance Relative Navigation Systems for Aviation" Sep. 26-29, 2006, Proceedings of the 19th International Technical Meeting of the Satellite Division of the Institute of Navigation (ION GNSS-2006), Fort Worth, TX, pp. 3024-3034.*

Sandra Verhagen, Improved performance of Multi-Carrier Ambiguity Resolution based on the Lambda method, 2006, Navitec Proceedings 2006, ESA-ESTEC, Noordwijk NL, pp. 1-8.*

Sandra Verhagen, (Verhagen hereinafter), The GNSS Integer Ambiguities: Estimation and Validation, Jan. 2005, Delft University of Technology, ISBN 90-804147-4-3, pp. i-iv, 1-3, 74-77, 81-83, 87, 102-104.*

* cited by examiner

*Primary Examiner* — Paul Rodriguez
*Assistant Examiner* — Juan Ochoa
(74) *Attorney, Agent, or Firm* — Carmen Patti Law Group, LLC

(57) ABSTRACT

A method for estimating a probability of failure of a least-squares ambiguity decorrelation adjustment (LAMBDA) method is provided. The LAMBDA method is used for estimation of double difference carrier phase integer ambiguity. A plurality of condition sets are selected. Each condition set comprises a probability of failure ($P_{boot-fail}$) for a boot-strap method of estimation of the double difference carrier phase integer ambiguity, a number of space vehicles ($N_{sv}$), and a ratio test tolerance for the LAMBDA method. A plurality of Monte Carlo simulations are run on the plurality of condition sets to obtain a plurality of result sets. Each result set comprises a probability of lambda fail ($P_{\lambda-fail}$) and a probability of lambda reject ($P_{\lambda-reject}$) for one condition set of the plurality of condition sets. A lookup table is created with the plurality of result sets. A value of $P_{\lambda-fail}$ for given values of $P_{\lambda-reject}$, $P_{boot-fail}$, and $N_{sv}$ is estimated through employment of the lookup table.

14 Claims, 6 Drawing Sheets

ESTIMATION OF PROBABILITY OF LAMBDA FAILURE THROUGH EMPLOYMENT OF LOOKUP TABLE

TECHNICAL FIELD

The invention relates generally to GPS systems and more particularly to estimation of double difference carrier phase integer ambiguity.

BACKGROUND

The Boot-Strap Method and the least-squares ambiguity decorrelation adjustment (LAMBDA) method are two different methods for estimating double difference carrier phase integer ambiguity using a carrier phase from two GPS receivers. The boot-strap method provides integers for the double difference carrier phase and also provides an analytical solution for a probability that the integers found are incorrect (i.e., not all integers are correct), for example, a probability that the boot-strap method has failed $P_{boot\text{-}fail}$. However, since the boot-strap method does not use residual errors, it has no capability for rejecting anomalous data.

The lambda method provides integers for the double difference carrier phase which may be different from those found by the boot-strap method. In addition, the lambda method allows rejection of anomalous data through a built-in analysis of residual errors, and by a comparison of best and second-best residual ratio ("the ratio test"). However, there is no known practical, analytical solution for a probability of failure for the lambda method, $P_{\lambda\text{-}fail}$.

SUMMARY

The invention in one implementation encompasses a method for estimating a probability of failure of a least-squares ambiguity decorrelation adjustment (LAMBDA) method. The LAMBDA method is used for estimation of double difference carrier phase integer ambiguity. A plurality of condition sets are selected. Each condition set comprises a probability of failure ($P_{boot\text{-}fail}$) for a boot-strap method of estimation of the double difference carrier phase integer ambiguity, a number of space vehicles ($N_{sv}$), and a ratio test tolerance for the LAMBDA method. A plurality of Monte Carlo simulations are run on the plurality of condition sets to obtain a plurality of result sets. Each result set comprises a probability of lambda fail ($P_{\lambda\text{-}fail}$) and a probability of lambda reject ($P_{\lambda\text{-}reject}$) for one condition set of the plurality of condition sets. A lookup table is created with the plurality of result sets. A value of $P_{\lambda\text{-}fail}$ for given values of $P_{\lambda\text{-}reject}$, $P_{boot\text{-}fail}$, and $N_{sv}$ is estimated through employment of the lookup table.

Another implementation of the invention encompasses an apparatus. The apparatus comprises a processor component configured to access a lookup table that comprises a plurality of result sets from a plurality of Monte Carlo simulations on a plurality of condition sets. Each condition set of the plurality of condition sets comprises: a probability of failure ($P_{boot\text{-}fail}$) for a boot-strap method for estimation of double difference carrier phase integer ambiguity, a ratio test tolerance for a least-squares ambiguity decorrelation adjustment (LAMBDA) method for estimation of double difference carrier phase integer ambiguity, and a number of space vehicles ($N_{sv}$). Each result set of the plurality of result sets comprises a probability of lambda fail ($P_{\lambda\text{-}fail}$) and a probability of lambda reject ($P_{\lambda\text{-}reject}$) for one condition set of the plurality of condition sets. The processor component is configured to employ the lookup table to estimate a value of $P_{\lambda\text{-}fail}$ for given values of $P_{\lambda\text{-}reject}$, $P_{boot\text{-}fail}$, and $N_{sv}$.

A further implementation of the invention encompasses an article. The article comprises one or more computer-readable signal-bearing media. The article comprises means in the one or more media for selecting a plurality of condition sets, wherein each condition set comprises a probability of failure ($P_{boot\text{-}fail}$) for a boot-strap method of estimation of the double difference carrier phase integer ambiguity, a ratio test tolerance for a least-squares ambiguity decorrelation adjustment (LAMBDA) method for estimation of the double difference carrier phase integer ambiguity, and a number of space vehicles ($N_{sv}$). The article comprises means in the one or more media for running a plurality of Monte Carlo simulations on the plurality of condition sets to obtain a plurality of result sets, wherein each result set comprises a probability of lambda fail ($P_{\lambda\text{-}fail}$) and a probability of lambda reject ($P_{\lambda\text{-}reject}$) for one condition set of the plurality of condition sets. The article further comprises means in the one or more media for creating a lookup table with the plurality of result sets. The article comprises means in the one or more media for estimating a value of $P_{\lambda\text{-}fail}$ for given values of $P_{\lambda\text{-}reject}$, $P_{boot\text{-}fail}$, and $N_{sv}$ through employment of the lookup table.

DESCRIPTION OF THE DRAWINGS

Features of example implementations of the invention will become apparent from the description, the claims, and the accompanying drawings in which:

DETAILED DESCRIPTION

Figure 1:
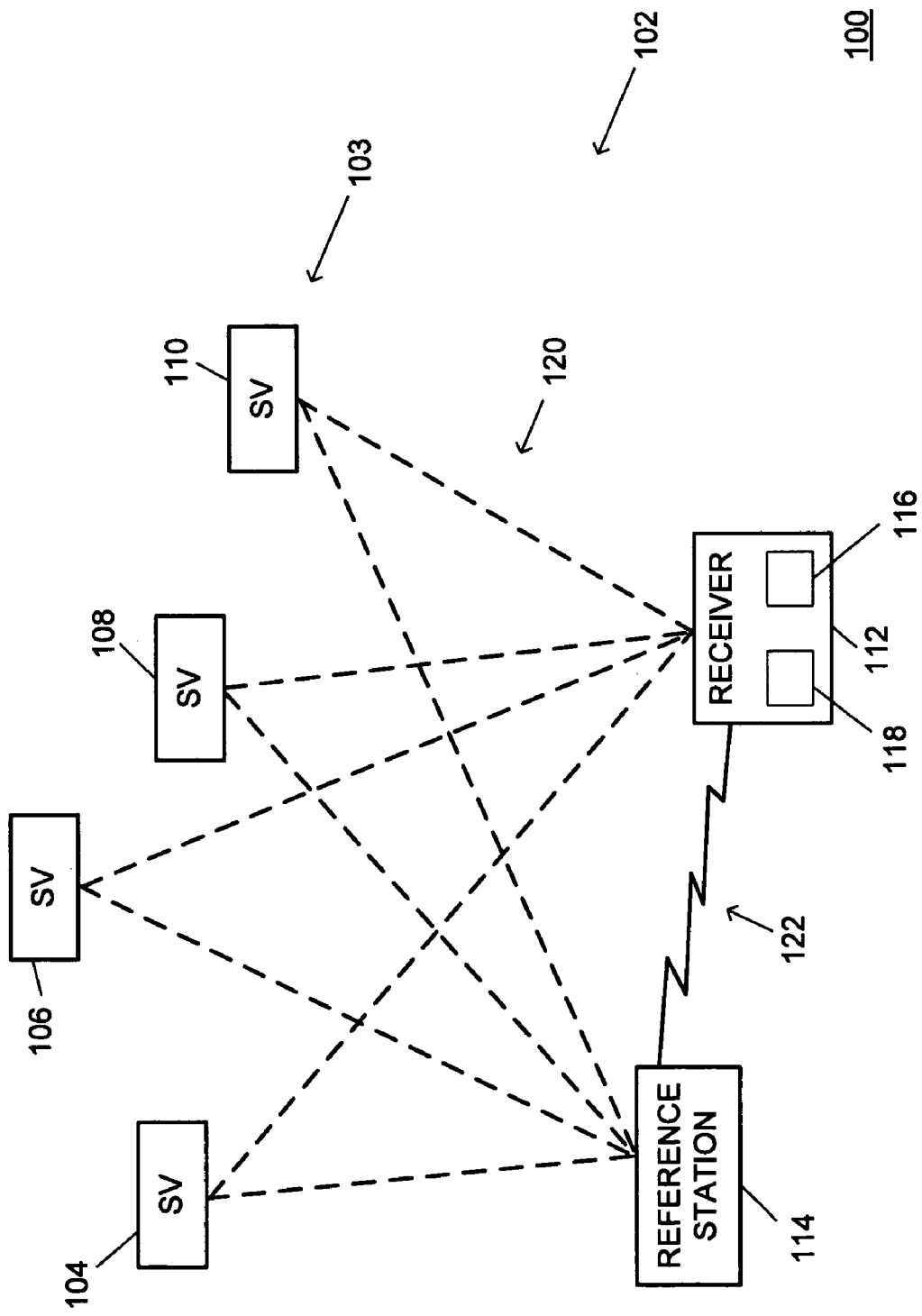
FIG. 1 is a representation of one implementation of an apparatus that comprises a GPS system.

Referring to the BACKGROUND above, the integers found with the bootstrap method and the probability $P_{boot\text{-}fail}$ are functions of system covariances, a number of space vehicles $N_{sv}$ (e.g., GPS satellites), and geometry of the space vehicles. The integers found with the lambda method and the probability $P_{\lambda\text{-}fail}$ are functions of the system covariances, $N_{sv}$, the geometry of the space vehicles, and a ratio test tolerance for the lambda method. The geometry of the space vehicles refers to the line of sight angles between a GPS receiver and the space vehicles it currently receives signals from, as will be appreciated by those skilled in the art.

If a lambda ratio (sqnorm2/sqnorm1) for the lambda method is greater than the ratio test tolerance, the lambda results will be accepted, and if the integers are incorrect, will thus result in a bad system update. If the lambda ratio is less than or equal to the ratio test tolerance, the lambda results will be rejected, thus resulting in no system update regardless of whether the integers were correct or not. Thus $P_{\lambda\text{-}fail}$ is the probability of the lambda method returning bad integers and passing the lambda ratio test (i.e., the lambda ratio is greater than the ratio test tolerance). $P_{\lambda\text{-}reject}$ is the probability that the lambda ratio test fails (i.e., the lambda ratio is less than or equal to the ratio test tolerance).

The probability of incorrect integers for the double difference carrier phase is desirable to determine a corresponding protection level for GPS calculations. The probability that the integers found by the lambda method are incorrect ($P_{\lambda\text{-}fail}$) is less than or equal to $P_{boot\text{-}fail}$. Accordingly, one conservative approach is to find the integers using both the lambda method and the bootstrap method and to use the integers found by the lambda method with the probability of failure of the bootstrap method.

For a given condition set (e.g., noise statistics, system covariances, $N_{sv}$, geometry of the space vehicles), a value of $P_{boot\text{-}fail}$ can be calculated. In one example, equations for the boot-strap method are implemented in their full form, using the "Z" transformation borrowed from the LAMBDA equations, and using sequential sorted updating per space vehicle. The true value of $P_{\lambda\text{-}fail}$ will in general be smaller than $P_{boot\text{-}fail}$, but will depend upon $N_{sv}$, the geometry, and the ratio test tolerance chosen. The variation in $P_{\lambda\text{-}fail}$ with respect to the geometry is volatile since a slight change of a fraction of a degree in the line of sight to a space vehicle will change the integer solution and this variation does not fit a known analytical function. However, through analysis with Monte Carlo simulations, it has been found that with an assumption of "bad" geometry, $P_{\lambda\text{-}fail}$ with a ratio test tolerance of 1.0 (no rejects) is equal to $P_{boot\text{-}fail}$. This result is independent of the actual value of the probability of failure and independent of the number of space vehicles $N_{sv}$. Bad geometry is that geometry, over a large number of random geometries, produces a largest value of $P_{boot\text{-}fail}$.

Turning to FIG. 1, an apparatus 100 in one example comprises a global positioning system 102. The global positioning system 102 comprises a plurality of space vehicles 103, for example, GPS satellites 104, 106, 108, and 110. The global positioning system 102 also comprises a receiver 112 and a reference station 114. The receiver 112 in one example comprises a processor 116. In a further example, the receiver 112 comprises an instance of a recordable data storage medium 118, as described herein. The receiver 112 in one example comprises a GPS-enabled personal digital assistant, GPS navigation unit, or other GPS receiver. The reference station 114 in one example comprises a GPS ground station or other GPS receiver with a known reference position (e.g., a fixed reference position).

The receiver 112 and the reference station 114 in one example receive GPS signals 120 from one or more of the plurality of space vehicles 103. The receiver 112 in one example is configured to determine its location by analyzing the GPS signals 120 that it receives, for example, by a triangulation method. The reference station 114 in one example determines carrier phase data based on the GPS signals 120 and transmits the carrier phase data to the receiver 112 through a communication link 122 (e.g., a wireless communication link).

The receiver 112 in one example is configured to estimate a double difference carrier phase integer ambiguity using the carrier phase from two GPS receivers. For example, the receiver 112 employs its own carrier phase data and the carrier phase data received from the reference station 114. The receiver 112 in one example employs a lookup table and both the lambda method and the boot-strap method to determine the double difference carrier phase integer ambiguity, as described herein.

Figure 2:
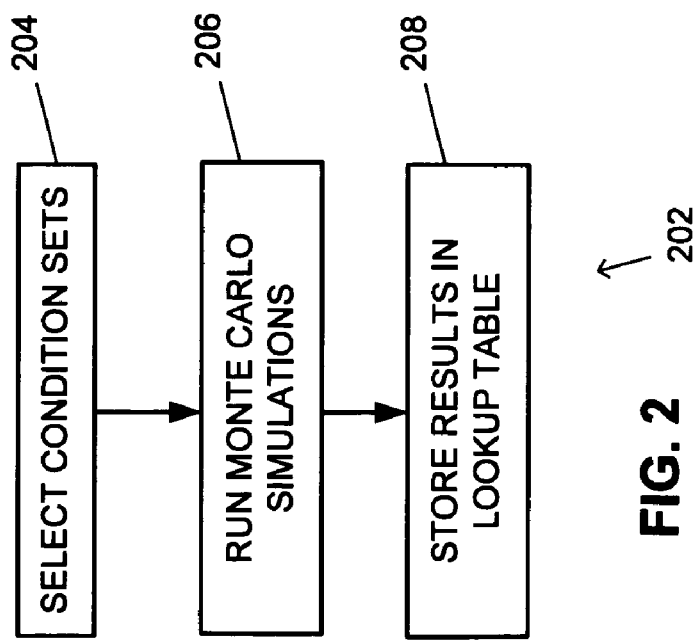
FIG. 2 is a representation of one example of a process flow for creation of a lookup table.

Turning to FIG. 2, a process flow 202 illustrates one example of steps for creation of lookup table. The lookup table in one example comprises a plurality of result sets from a plurality of Monte Carlo simulations on a plurality of condition sets. In the examples discussed herein, the processor 116 runs the Monte Carlo simulations to create the lookup table. In alternative implementations, an external device, processor, or computer (not shown) runs the Monte Carlo simulations and stores the lookup table in a computer-readable signal bearing medium, such as the recordable data storage medium 118. The lookup table may then be accessed from the recordable data storage medium 118 by the processor 116. This implementation in one example reduces the processing power required by the receiver 112, which allows the receiver 112 to be a smaller, hand-held device.

The condition sets of the plurality of condition sets ($CS_i$, where i is an integer) comprise a probability of failure $P_{boot\text{-}fail}$ for the boot-strap method, a number of space vehicles $N_{sv}$ that the receiver 112 is currently receiving GPS data 120 from, and a ratio test tolerance for the lambda method. The processor 116 in one example selects (STEP 204) the plurality of condition sets. For example, the processor 116 selects a plurality of values for each of $P_{boot\text{-}fail}$, $N_{sv}$, and the ratio test tolerance and then selects each condition set $CS_i$ as a unique combination of one value of the plurality of values for $P_{boot\text{-}fail}$, one value of the plurality of values for $N_{sv}$, and one value of the plurality of values for the ratio test tolerance.

The processor 116 in one example runs (STEP 206) a plurality of Monte Carlo simulations ($MC_{i\text{-}j}$, where j is an integer) on each condition set $CS_i$ while assuming "bad" or "worst case" geometry for the GPS satellites 103, which produces a plurality of result sets $RS_i$ (e.g., one result set per condition set). The worst case geometry in one example is geometry selected from a large number of random geometries which provides a largest value for $P_{boot\text{-}fail}$. Since only "bad" or "worst case" geometry is evaluated, rather than "every" geometry, only a finite and reasonably small number j of Monte Carlo simulations are run. The value of j is sufficiently large for an acceptable confidence level of results or as large as processing resources allow, as will be appreciated by those skilled in the art. The result sets $RS_i$ comprise a probability of lambda failure $P_{\lambda\text{-}fail}$ and a probability of lambda reject $P_{\lambda\text{-}reject}$. The processor 116 in one example stores (STEP 208) the values of $P_{\lambda\text{-}fail}$ and $P_{\lambda\text{-}reject}$ as the lookup table in the recordable data storage medium 118. In another example, the processor 116 runs the Monte Carlo simulations on a subset of the plurality of conditions. For example, the processor 116 runs the Monte Carlo simulations on $N_{av}$ and $P_{boot\text{-}fail}$ but omits the condition of ratio test tolerance, since the ratio test tolerance is already within the results from the condition sets, as will be appreciated by those skilled in the art. In the example presented herein, 30 million Monte Carlo simulations were run on each of 30 condition sets for $P_{boot\text{-}fail}$ and $N_{sv}$.

Figure 3:
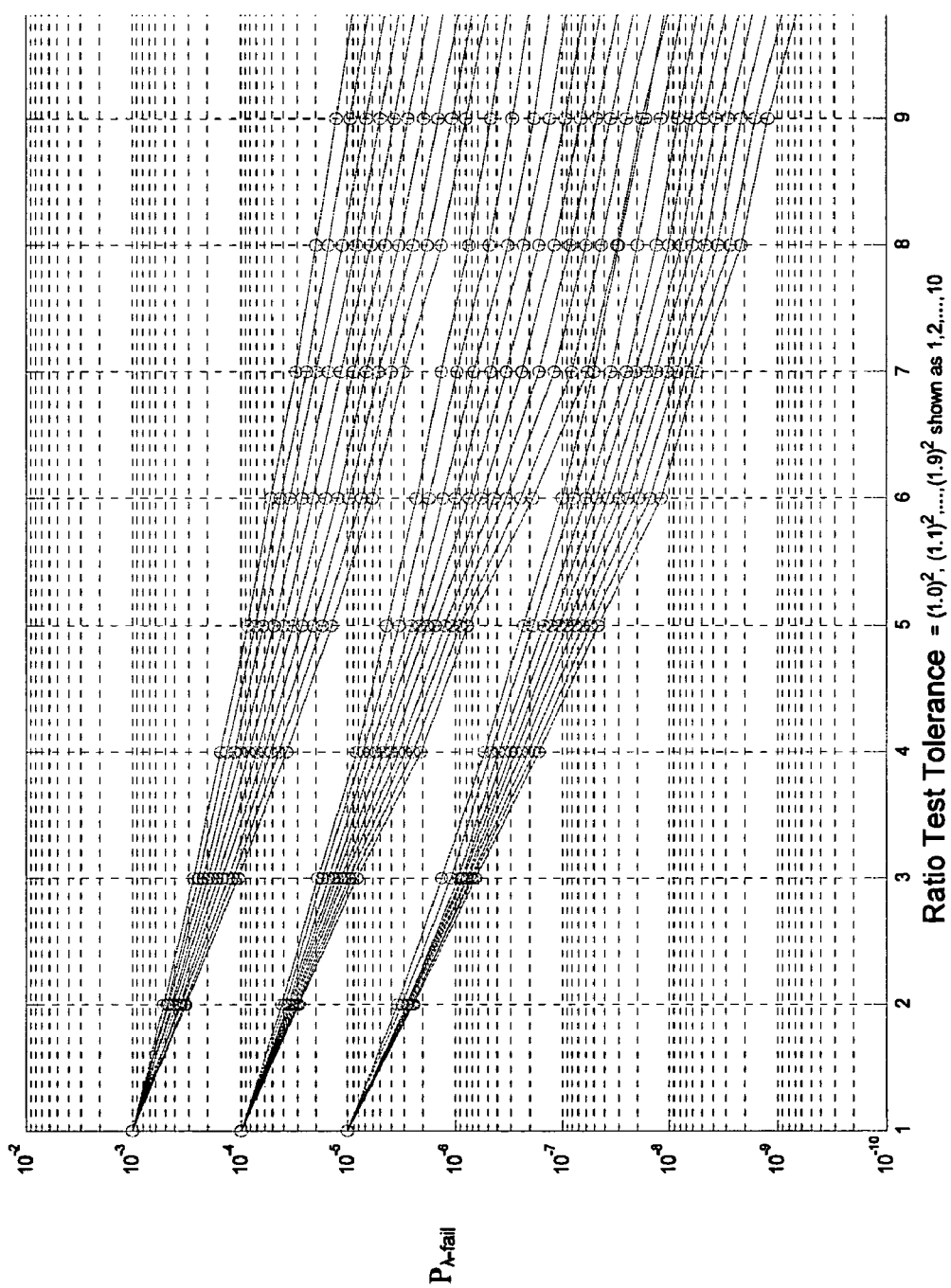
FIG. 3 is a representation of one example of a data plot for a result set of the lookup table of FIG. 2 and illustrating values for $P_{\lambda\text{-}fail}$.
Figure 4:
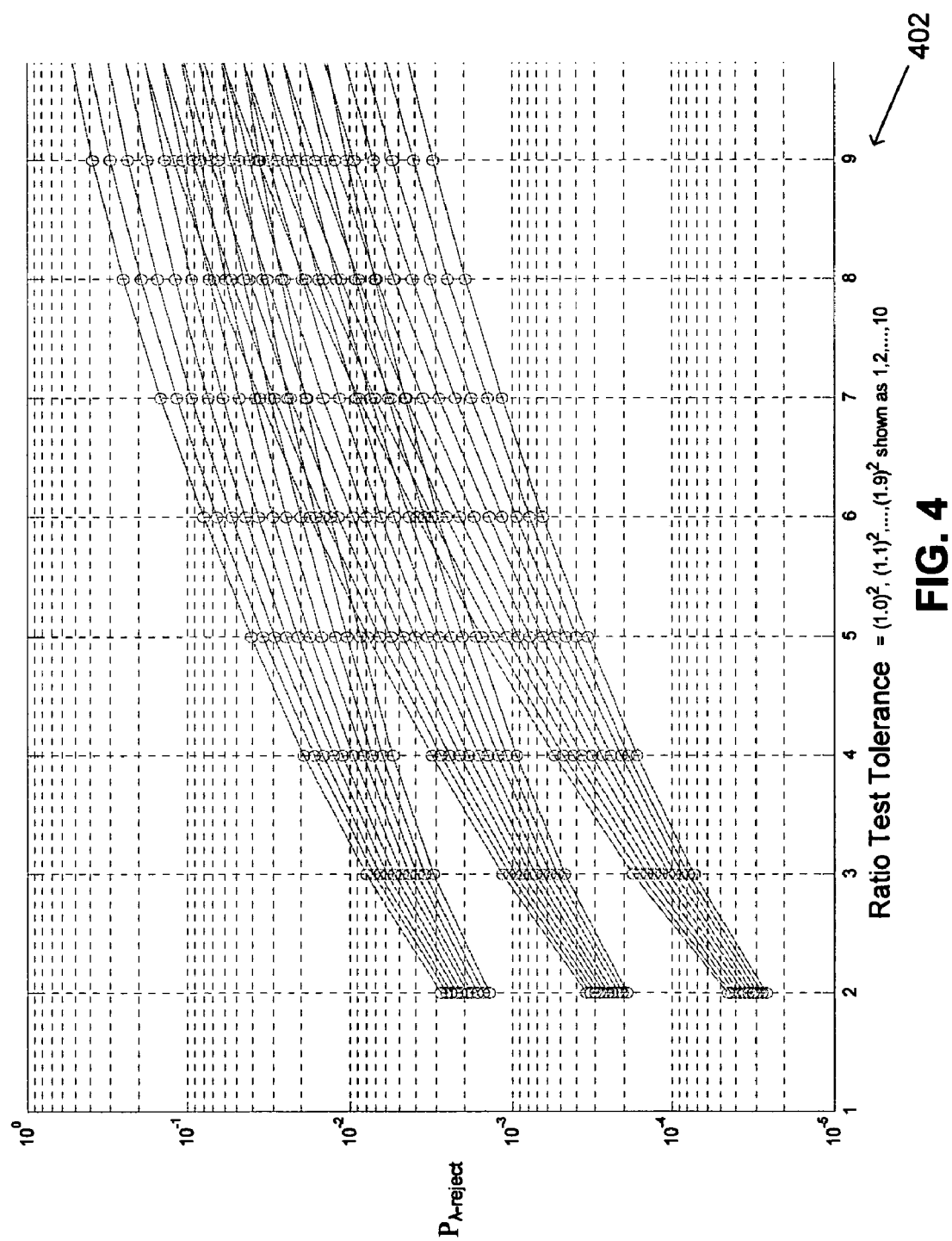
FIG. 4 is a representation of one example of a data plot for the result set of the lookup table of FIG. 2 and illustrating values for $P_{\lambda\text{-}reject}$.

Turning to FIGS. 3-4, example values for $P_{\lambda\text{-}fail}$ and example values for $P_{\lambda\text{-}reject}$ from the result sets $RS_i$ are illustrated in plots 302 and 402, respectively. The condition sets $CS_i$ in this example are selected from the following:

| | |
|---|---|
| $P_{boot\text{-}fail}$: | 0.001, 0.0001, and 0.00001 |
| $N_{sv}$: | 3, 4, 5, 6, 7, 8, 9, 10, 11, 12 |
| ratio test tolerance.: | $1.0^2$, $1.1^2$, $1.2^2$, $1.3^2$, $1.4^2$, $1.5^2$, $1.6^2$, $1.7^2$, $1.8^2$, and $1.9^2$ |

For example, a first condition set comprises a value for $P_{boot\text{-}fail}$ of 0.001, a value for $N_{sv}$ of 3, and a value for ratio test tolerance of $1.0^2$. Another condition set comprises a value for $P_{boot\text{-}fail}$ of 0.0001, a value for $N_{sv}$ of 10, and a value for ratio test tolerance of $1.7^2$. In this example, there are 3×10×10 unique combinations for a total of 300 condition sets $CS_i$ and result sets $RS_i$ (i=1 to 300). In alternative implementations, the number of values for each condition may be increased or reduced. For example, additional values of $P_{boot\text{-}fail}$, $N_{sv}$, and the ratio test tolerance may be added to increase the number of condition sets. As one additional example, the values of $P_{boot\text{-}fail}$ further comprise 0.01 and 0.000001, which allows for 5×10×10 unique combinations and 500 condition sets $CS_i$ and result sets $RS_i$ (i=1 to 500).

Referring to FIG. 3, the plot 302 shows 300 points (circles) for values of $P_{\lambda\text{-}fail}$ from the result sets $RS_i$. Lines have been drawn between circles by linear extrapolation (log-log) for visualization, but only the points themselves were obtained from the Monte Carlo simulations. As drawn, there are thirty curves, each curve with ten points and grouped into three families of ten curves each. Consider the top "curve" in FIG. 3. This curve was created by joining ten points. The ten points represent the following ten conditions:

| | |
|---|---|
| 1 value of $P_{boot\text{-}fail}$: | 0.001 |
| 1 value of $N_{sv}$: | 3 |
| 10 values of ratio test tolerance: | $1.0^2, 1.1^2, 1.2^2, 1.3^2, 1.4^2, 1.5^2, 1.6^2,$ $1.7^2, 1.8^2, 1.9^2$ |

The point is placed along the x-axis according to the value of the ratio test tolerance. The values of $P_{boot\text{-}fail}$ and $N_{sv}$ are parameters for this curve. The position of the point on the y-axis represents the value of $P_{\lambda\text{-}fail}$ that was obtained from the large number of Monte Carlo simulations for this condition. For example, for the first point on the top curve, the conditions are:

$$P_{boot\text{-}fail}=0.001, N_{sv}=3, \text{ratio test tolerance}=1.0^2,$$

which correspond to a result of $P_{\lambda\text{-}fail}=0.001(10^{-3})$. For the last point on the top curve, the conditions are:

$$P_{boot\text{-}fail}=0.001, N_{sv}=3, \text{ratio test tolerance}=1.9^2,$$

which correspond to a result of $P_{\lambda\text{-}fail}\approx 8E-6$.

Considering the first ten curves as a family which share a value of $P_{boot\text{-}fail}$, the parameter $N_{sv}$ varies from three to twelve. The next ten curves may be considered as a family with the parameter $P_{boot\text{-}fail}=0.0001$ and $N_{sv}$ varying from three to twelve. Considering the next ten curves as a family, they use the parameter $P_{boot\text{-}fail}=0.00001$ and $N_{sv}$ varying from three to twelve. For example, the 300th point, which is the 10th point on the 30th curve, represents the condition:

$$P_{boot\text{-}fail}=0.00001, N_{sv}=3, \text{ratio test tolerance}=1.9^2,$$

which corresponds to a value of $P_{\lambda\text{-}fail}\approx 6E-10$.

Referring to FIG. 4, the plot 402 is analogous to plot 302 but instead shows the values of $P_{\lambda\text{-}reject}$ from the result sets $RS_i$. For example, the conditions:

$$P_{boot\text{-}fail}=0.001, N_{sv}=3, \text{ratio test tolerance}=1.9^2,$$

correspond to $P_{\lambda\text{-}reject}\approx 0.55$. As in plot 302, the curves can be grouped into families of ten curves based on the parameter $P_{boot\text{-}fail}$.

Figure 5:
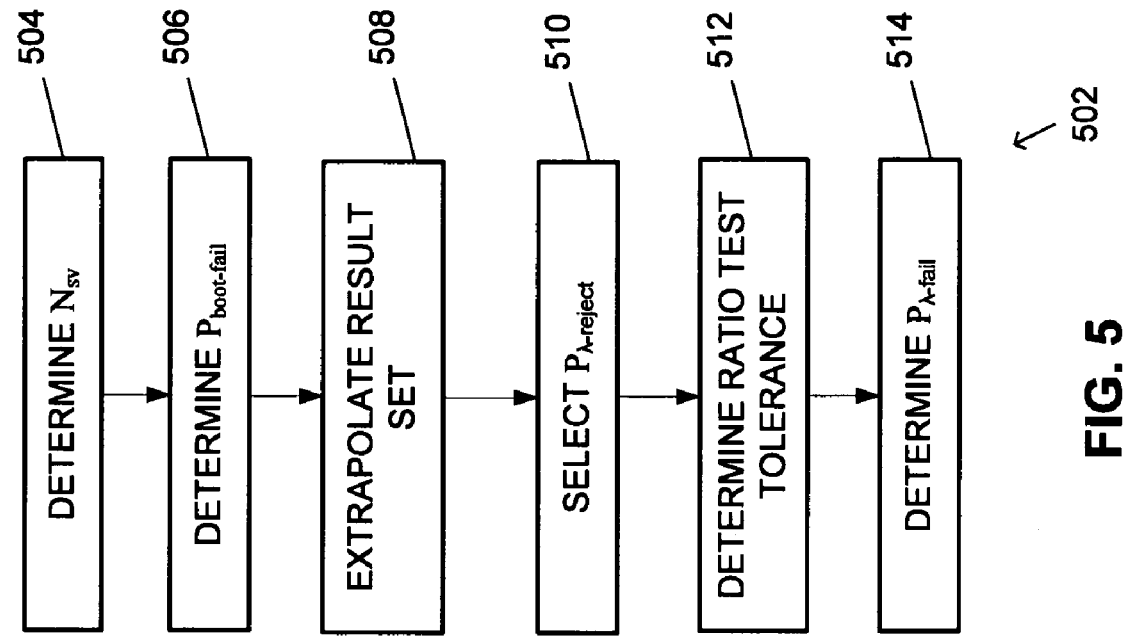
FIG. 5 is a representation of one example of a process flow for estimation of $P_{\lambda\text{-}fail}$ using the lookup table.

Turning to FIG. 5, the processor 116 in one example performs a process flow 502 to estimate $P_{\lambda\text{-}fail}$. Since $P_{\lambda\text{-}fail}$ is less than or equal to $P_{boot\text{-}fail}$, the lookup table can be used to estimate $P_{\lambda\text{-}fail}$ when given values of $P_{boot\text{-}fail}$, $N_{sv}$, and $P_{\lambda\text{-}reject}$. The lookup table in one example is pre-constructed, which simplifies the determination of $P_{\lambda\text{-}fail}$ so that the processor 116 may perform the determination in real-time.

Referring to FIG. 5, the processor 116 determines (STEP 504) a current value of $N_{sv}$ and determines (STEP 506) a current value of $P_{boot\text{-}fail}$, for example, based on current conditions of the receiver 112, the reference station 114, and the space vehicles 103. The current values of $P_{boot\text{-}fail}$ and $N_{sv}$ are used as an index for the lookup table. There are then three remaining parameters:

test tolerance ratio, $P_{\lambda\text{-}reject}$, and $P_{\lambda\text{-}fail}$ where specifying any one of the three determines the remaining two. If the current value of $P_{boot\text{-}fail}$ is not found in the lookup table, the processor 116 in one example extrapolates (STEP 508) a result set from the lookup table.

Figure 6:
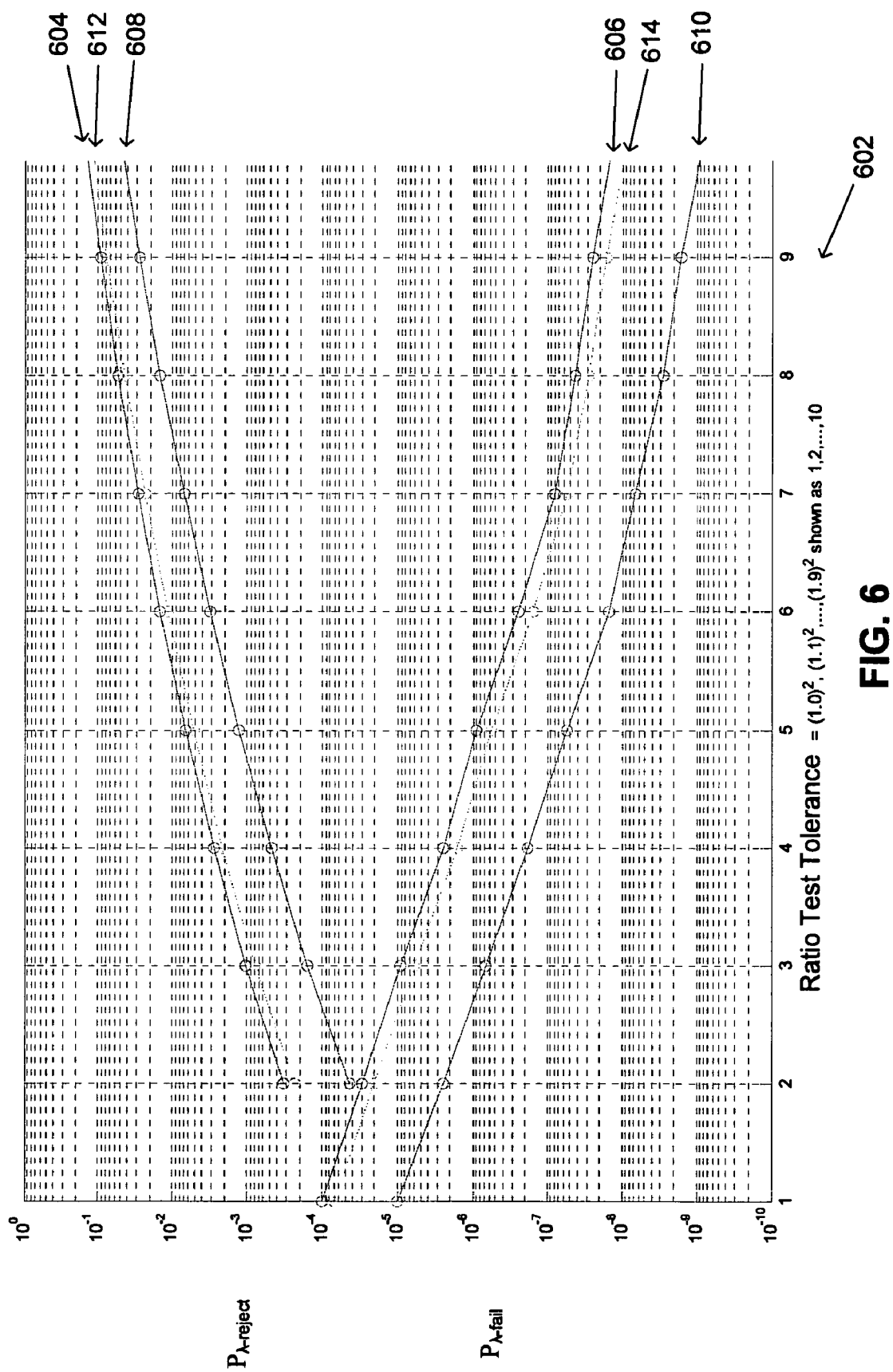
FIG. 6 is a representation of one example of an extrapolation of a combined result set from the lookup table.

Turning to FIG. 6, a plot 602 shows one example of an extrapolation of a combined result set for the conditions:

| | |
|---|---|
| 1 value of $P_{boot\text{-}fail}$: | 0.00007 |
| 1 value of $N_{sv}$: | 11 |
| 10 values of ratio test tolerance: | $1.0^2, 1.1^2, 1.2^2, 1.3^2, 1.4^2, 1.5^2, 1.6^2,$ $1.7^2, 1.8^2, 1.9^2$ |

For simplicity, both $P_{\lambda\text{-}fail}$ and $P_{\lambda\text{-}reject}$ are shown together. The processor 116 in one example selects first and second subsets of the plurality of result sets which are functions of the ratio test tolerance. The first subset corresponds to the data points and curves of plots 302 and 402 with the current value of $N_{sv}$ and a value of $P_{boot\text{-}fail}$ that is greater than and closest to the current value of $P_{boot\text{-}fail}$ (i.e., $P_{boot\text{-}fail}=0.0001$). The second subset corresponds to the data points and curves of plots 302 and 402 with the current value of $N_{sv}$ and a value of $P_{boot\text{-}fail}$ that is less than and closest to the current value of $P_{boot\text{-}fail}$ (i.e., 0.00001). Referring to FIG. 6, the first subset corresponds to an upper bound 604 of $P_{\lambda\text{-}reject}$ and an upper bound 606 of $P_{\lambda\text{-}fail}$. The second subset corresponds to a lower bound 608 of $P_{\lambda\text{-}reject}$ and a lower bound 610 of $P_{\lambda\text{-}fail}$. The processor 116 in one example extrapolates the combined result set (illustrated as curves 612 and 614) from the first subset and the second subset. In a further example, the processor 116 employs a log-log extrapolation to obtain the combined result set. For example, a ratio test tolerance of $1.1^2$, where $N_{sv}=11$ and $P_{boot\text{-}fail}=0.00007$ corresponds to $$P_{\lambda\text{-}fail}\approx 2E-5 \text{ and } P_{\lambda\text{-}reject}\approx 2.5E-4$$

Figure 7:
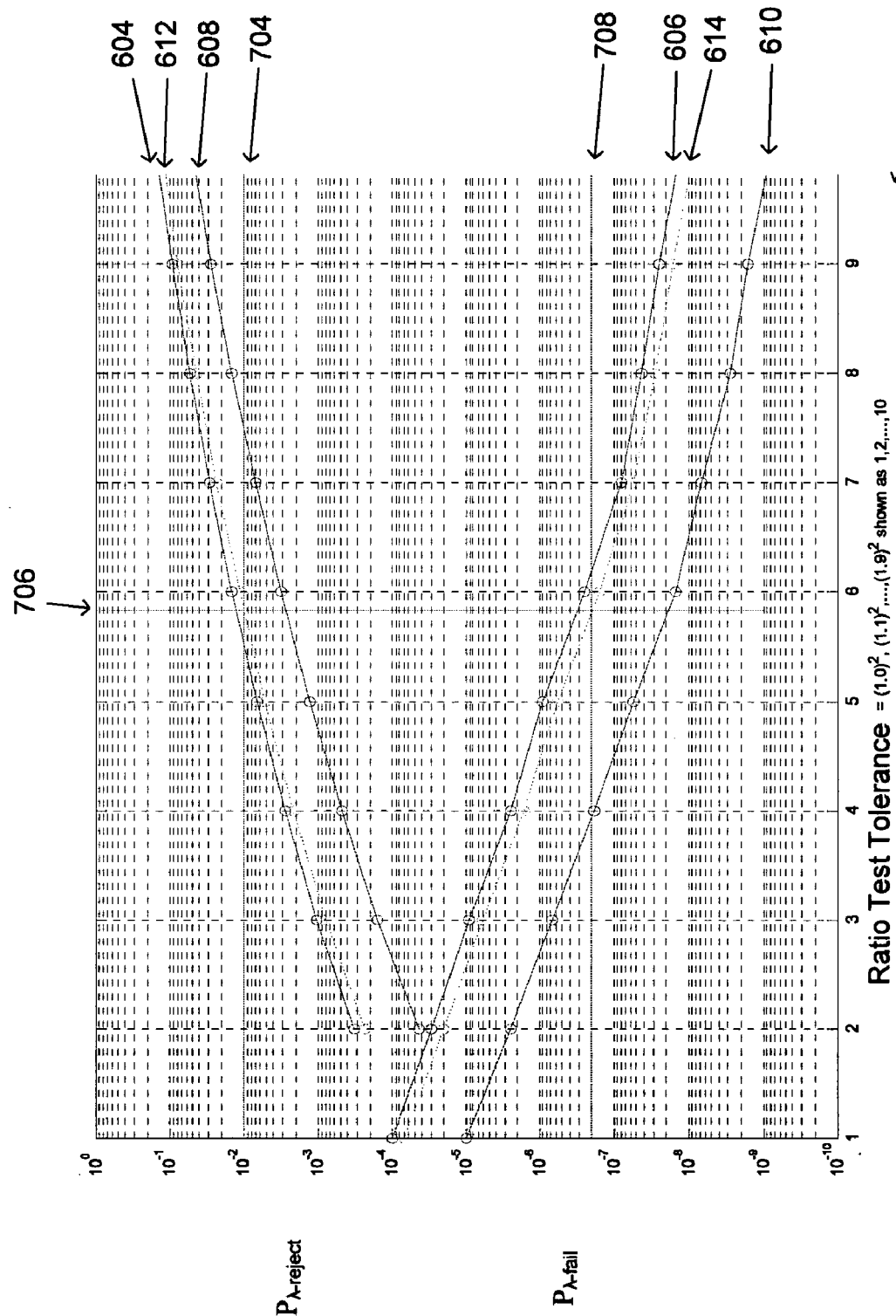
FIG. 7 is a representation of one example of a determination of $P_{\lambda\text{-}fail}$ for the combined result set of FIG. 6 and the lookup table.

Turning to FIG. 7, a plot 702 shows one example of a determination of $P_{\lambda\text{-}fail}$ for given values of $P_{\lambda\text{-}reject}$, $P_{boot\text{-}fail}$, and $N_{sv}$. Plot 702 is analogous to plot 602, where $P_{boot\text{-}fail}=0.00007$ and $N_{sv}=11$. At this point it will be noted that a trade-off can be made. The larger the ratio test tolerance, the smaller $P_{\lambda\text{-}fail}$ will be, but the larger $P_{\lambda\text{-}reject}$ will be. Accordingly, a better integrity causes a worse availability. The processor 116 in one example selects (STEP 510) an acceptable value of $P_{\lambda\text{-}reject}$ based on desired performance for the receiver 112 and other factors, such as an available velocity backup from an inertial measurement unit (not shown). The processor 116 in one example determines (STEP 512) the ratio test tolerance and (STEP 514) the value of $P_{\lambda\text{-}fail}$ in real time. For example, if a value of $P_{\lambda\text{-}reject}=0.01$ (i.e., 1% rejection rate) is acceptable to the receiver 112, a corresponding value of the ratio test tolerance is determined from the combined result set. The processor 116 in one example determines the value of $P_{\lambda\text{-}fail}$ based on the ratio test tolerance.

Referring to FIG. 7, a horizontal line 704 is drawn at the 0.01 probability level until it intersects the $P_{\lambda\text{-}reject}$ curve. A vertical line 706 then indicates the desired ratio test tolerance (STEP 512). The intersection of the vertical line 706 with the $P_{\lambda\text{-}fail}$ curve determines a point, which, when extended horizontally (line 708) to the vertical axis of the plot 702, gives the desired $P_{\lambda\text{-}fail}$ (STEP 514). Referring to FIG. 7, the horizontal line 704 indicates the acceptable value of $P_{\lambda\text{-}reject}$, which corresponds to a ratio test tolerance of slightly less than $1.5^2$. This ratio test tolerance corresponds to a value of $P_{\lambda\text{-}fail} \approx 1.7E\text{-}7$. While the above steps are indicated graphically for illustration, in alternative implementations, the processor 116 performs the steps mathematically (i.e., without drawing curves and lines), as will be appreciated by those skilled in the art.

The apparatus 100 in one example comprises a plurality of components such as one or more of electronic components, hardware components, and computer software components. A number of such components can be combined or divided in the apparatus 100. An example component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more implementations of the invention. Examples of a computer-readable signal-bearing medium for the apparatus 100 comprise the recordable data storage medium 118 of the receiver 112. The computer-readable signal-bearing media for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for estimating a probability of failure of a least-squares ambiguity decorrelation adjustment (LAMBDA) method, wherein the LAMBDA method is used for estimation of double difference carrier phase integer ambiguity, the method for estimating the probability of failure comprising the steps of:
   selecting a plurality of condition sets, wherein each condition set comprises a probability of failure ($P_{boot\text{-}fail}$) for a boot-strap method of estimation of the double difference carrier phase integer ambiguity, a number of space vehicles ($N_{sv}$), and a ratio test tolerance for the LAMBDA method;
   running a plurality of Monte Carlo simulations on the plurality of condition sets to obtain a plurality of result sets, wherein each result set comprises a probability of lambda fail ($P_{\lambda\text{-}fail}$) and a probability of lambda reject ($P_{\lambda\text{-}reject}$) for one condition set of the plurality of condition sets;
   creating a lookup table with the plurality of result sets;
   estimating a value of $P_{\lambda\text{-}fail}$ for given values of $P_{\lambda\text{-}reject}$, $P_{boot\text{-}fail}$, and $N_{sv}$ through employment of the lookup table.

2. The method of claim 1, wherein the plurality of condition sets comprise condition sets $CS_i$, wherein the plurality of result sets comprise result sets $RS_i$, where i is an integer;
   wherein the step of running the plurality of Monte Carlo simulations on the plurality of condition sets to obtain the plurality of result sets comprises the step of:
   running a plurality of Monte Carlo simulations $MC_{i\text{-}j}$ on each condition set $CS_i$ to obtain the plurality of result sets $RS_i$, where j is an integer.

3. The method of claim 1, wherein the step of estimating the value of $P_{\lambda\text{-}fail}$ for given values of $P_{\lambda\text{-}reject}$, $P_{boot\text{-}fail}$, and $N_{sv}$ through employment of the lookup table comprises the steps of:
   determining a current value of $N_{sv}$;
   determining a current value of $P_{boot\text{-}fail}$;
   extrapolating a combined result set from the lookup table through employment of the current value of $N_{sv}$ and the current value of $P_{boot\text{-}fail}$, wherein the combined result set comprises extrapolated values for $P_{\lambda\text{-}fail}$ and $P_{\lambda\text{-}reject}$ against the plurality of ratio test tolerances of the plurality of condition sets.

4. The method of claim 3, further comprising the steps of:
   selecting a desired value of $P_{\lambda\text{-}reject}$ as a design parameter;
   determining a value of ratio test tolerance that corresponds to the desired value of $P_{\lambda\text{-}reject}$ through employment of the combined result set;
   determining a value of $P_{\lambda\text{-}fail}$ that corresponds to the value of ratio test tolerance.

5. The method of claim 4, wherein the step of determining the current value of $P_{boot\text{-}fail}$ comprises the step of:
   calculating $P_{boot\text{-}fail}$ based on current noise statistics, the current value of $N_{sv}$, and current geometry of the space vehicles.

6. The method of claim 3, wherein the step of extrapolating the combined result set comprises the step of:
   extrapolating the combined result set through employment of a log-log extrapolation.

7. The method of claim 3, wherein the step of extrapolating the combined result set comprises the step of:
   selecting a first subset of the plurality of result sets, wherein each result set of the first subset corresponds to a condition set with the current value of $N_{sv}$ and a value of the $P_{boot\text{-}fail}$ that is greater than and closest to the current value of $P_{boot\text{-}fail}$;
   selecting a second subset of the plurality of result sets, wherein each result set of the second subset corresponds to a condition set with the current value of $N_{sv}$ and a value of the $P_{boot\text{-}fail}$ that is less than and closest to the current value of $P_{boot\text{-}fail}$;
   extrapolating the combined result set from the first subset and the second subset.

8. The method of claim 7, wherein the first subset of result sets and the corresponding condition sets comprise data points for an upper bound of $P_{\lambda\text{-}reject}$ and an upper bound of $P_{\lambda\text{-}fail}$;
   wherein the second subset of result sets and the corresponding condition sets comprise data points for a lower bound of $P_{\lambda\text{-}reject}$ and a lower bound of $P_{\lambda\text{-}fail}$;
   wherein the upper and lower bounds of $P_{\lambda\text{-}reject}$ are functions of the ratio test tolerance;
   wherein the upper and lower bounds of $P_{\lambda\text{-}fail}$ are functions of the ratio test tolerance.

9. The method of claim 1, wherein the step of selecting the plurality of condition sets comprises the steps of:
- selecting a plurality of values for the probability of failure $P_{boot\text{-}fail}$;
- selecting a plurality of values for the number of space vehicles $N_{sv}$;
- selecting a plurality of values for the ratio test tolerance;
- selecting each condition set as a unique combination of one value of the plurality of values for $P_{boot\text{-}fail}$, one value of the plurality of values for $N_{av}$, and one value of the plurality of values for the ratio test tolerance.

10. The method of claim 1, wherein the step of running the plurality of Monte Carlo simulations on the plurality of condition sets to obtain the plurality of result sets comprises the step of:
- running the plurality of Monte Carlo simulations on the plurality of result sets using an assumption of worst case geometry for the space vehicles.

11. An apparatus, comprising:
- a processor component configured to access a lookup table that comprises a plurality of result sets from a plurality of Monte Carlo simulations on a plurality of condition sets;
- wherein each condition set of the plurality of condition sets comprises:
  - a probability of failure ($P_{boot\text{-}fail}$) for a boot-strap method for estimation of double difference carrier phase integer ambiguity,
  - a ratio test tolerance for a Least-squares ambiguity decorrelation adjustment (LAMBDA) method for estimation of double difference carrier phase integer ambiguity, and
  - a number of space vehicles ($N_{sv}$);
- wherein each result set of the plurality of result sets comprises a probability of lambda fail ($P_{\lambda\text{-}fail}$) and a probability of lambda reject ($P_{\lambda\text{-}reject}$) for one condition set of the plurality of condition sets;
- wherein the processor component is configured to employ the lookup table to estimate a value of $P_{\lambda\text{-}fail}$ for given values of $P_{\lambda\text{-}reject}$, $P_{boot\text{-}fail}$, and $N_{sv}$.

12. The apparatus of claim 11, wherein the processor component is configured to extrapolate a combined result set from the lookup table through employment of a current value of and a current value of $P_{boot\text{-}fail}$;
- wherein the combined result set comprises extrapolated values for $P_{\lambda\text{-}fail}$ and $P_{\lambda\text{-}reject}$ against the plurality of ratio test tolerances of the plurality of condition sets.

13. The apparatus of claim 12, wherein the processor component is configured to determine a value of the ratio test tolerance that corresponds to an acceptable value of $P_{\lambda\text{-}reject}$ through employment of the combined result set;
- wherein the processor component is configured to determine a value of $P_{\lambda\text{-}fail}$ that corresponds to the value of ratio test tolerance.

14. The apparatus of claim 11, wherein the processor component is configured to run the plurality of Monte Carlo simulations on the plurality of condition sets using an assumption of worst case geometry for the space vehicles.

* * * * *